United States Patent
Rubin

(10) Patent No.: US 8,155,949 B1
(45) Date of Patent: Apr. 10, 2012

(54) GEODESIC SEARCH AND RETRIEVAL SYSTEM AND METHOD OF SEMI-STRUCTURED DATABASES

(75) Inventor: Stuart H Rubin, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 861 days.

(21) Appl. No.: 12/243,049

(22) Filed: Oct. 1, 2008

(51) Int. Cl.
*G06F 17/27* (2006.01)

(52) U.S. Cl. ............ 704/9; 706/1; 706/47; 706/55; 706/59; 706/60; 706/61

(58) Field of Classification Search .......... 704/9; 706/1, 706/47, 55, 59–61
See application file for complete search history.

(56) References Cited

U.S. PATENT DOCUMENTS

| | | | | |
|---|---|---|---|---|
| 5,924,105 | A * | 7/1999 | Punch et al. | 715/234 |
| 6,026,388 | A | 2/2000 | Liddy et al. | |
| 6,456,991 | B1 * | 9/2002 | Srinivasa et al. | 706/20 |
| 7,047,226 | B2 | 5/2006 | Rubin | |
| 7,085,708 | B2 | 8/2006 | Manson | |
| 7,146,349 | B2 | 12/2006 | Benitez-Jimenez et al. | |
| 7,203,668 | B2 | 4/2007 | Lamping et al. | |
| 7,383,172 | B1 | 6/2008 | Jamieson | |
| 7,853,540 | B2 * | 12/2010 | Baum | 706/13 |
| 7,925,605 | B1 * | 4/2011 | Rubin | 706/47 |
| 2004/0024724 | A1 * | 2/2004 | Rubin | 706/55 |
| 2005/0097628 | A1 * | 5/2005 | Lussier et al. | 800/260 |
| 2005/0154692 | A1 * | 7/2005 | Jacobsen et al. | 706/47 |
| 2006/0224543 | A1 * | 10/2006 | Clymer et al. | 706/47 |
| 2007/0094212 | A1 * | 4/2007 | Das et al. | 706/50 |
| 2008/0071714 | A1 * | 3/2008 | Menich et al. | 706/45 |
| 2008/0104071 | A1 * | 5/2008 | Pragada et al. | 707/6 |
| 2009/0012928 | A1 * | 1/2009 | Lussier et al. | 706/59 |

OTHER PUBLICATIONS

Rubin et al. "Geodesic Search and Retrieval of Semi-Structured Databases" Oct. 7-10, 2007.*
Liang et al. "Randomized Local Extrema for Hueristic Selection in TSP" Sep. 2006.*
Rubin et al. "T2K2: A Type II KASER" Sep. 2006.*
Wiratunga et al. "Feature Selection and Generalisation for Retrieval of Textual Cases" 2004.*
Rubin et al. "KASER: A Qualitatively Fuzzy Object-Oriented Inference Engine" 2002.*
Rubin et al. "On the Fusion and Transference of Knowledge: Part II" 2003.*
Rubin et al. "Generalization of Attributes Before Mining to Enable Rule Discovery" 2000.*
Rubin et al. "A Learning-by-Metaphor Human-Machine System" Oct. 8-11, 2006.*

(Continued)

*Primary Examiner* — Richemond Dorvil
*Assistant Examiner* — Greg Borsetti
(74) *Attorney, Agent, or Firm* — Kyle Eppele; Stephen E. Baldwin

(57) ABSTRACT

A knowledge-based decision support system that allows for communication and learning to occur using natural language is presented. The system has a capability to automatically extract features from the natural language using symmetric reductions and random search. The iterative generalization of the rule base and checking of the resultant base against a case base from which the generalizations are induced is also provided. The decision support system can be used to search semi-structured databases and automatically learns new knowledge and search control knowledge where it is most needed based on the pattern of previous rule firings.

13 Claims, 1 Drawing Sheet

OTHER PUBLICATIONS

Owais et al. "Evolutionary Learning of Boolean Queries by Genetic Programming" 2005.*
Agrawal et al. "Mining Association Rules between Sets of Items in Large Databases" 1993.*
Fazendeiro et al. "A semantic driven evolutive fuzzy clustering algorithm" 2007.*
Morariu et al. "Evolutionary Feature Selection for Text Documents using the SVM" 2006.*
Yasuhiko Dote and Seppo J. Ovaska; "Industrial Applications of Soft Computing: A Review"; Proceedings of the IEEE; Sep. 2001; pp. 1243-1265; vol. 89; No. 9; 23 pages, pp. 1243-1265.
S.H. Rubin; "On Randomization and Discovery"; Information Sciences; Jan. 2007; pp. 170-191; vol. 177; Issue 1; Elsevier Inc.; 22 pages, pp. 170-191.
Gregory J. Chaitin; "Information-Theoretic Limitations of Formal Systems"; Journal of the ACM; 1974; pp. 403-424; vol. 21; 43 pages, pp. 1-43.
Gregory J. Chaitin; "Randomness and Mathematical Proof"; Scientific American; May 1975; pp. 47-52; vol. 232; No. 5; 10 pages, pp. 1-10.
Stuart H. Rubin; "On the Auto-Randomization of Knowledge"; Proceedings of the IEEE Int. Conf. Info. Reuse and Integration; 2004; pp. 308-313; Las Vegas, NV; 6 pages, pp. 308-313.
Jyh-Han Lin and Jeffrey Scott Vitter; "Complexity Results on Learning by Neural Nets"; Machine Learning; 1991; pp. 211-230; vol. 6; No. 3; Kluwer Academic Publishers, Boston, MA; 20 pages, pp. 211-230.
Stuart H. Rubin, Shu-Ching Chen and Mei-Ling Shyu; "Field-Effect Natural Language Semantic Mapping"; Proceedings of the IEEE Int. Conf. Syst. Man. Cybern.; 2003; pp. 2483-2487; Washington, DC; 6 pages, pp. 2483-2488.
Stuart H. Rubin; "Computing with Words"; IEEE Transactions on Systems, Man, and Cybernetics; Aug. 1999; pp. 518-524; vol. 29; No. 4; 7 pages, pp. 518-524.
Lotfi A. Zadeh; "From Computing with Numbers To Computing with Words-From Manipulation of Measurements to Manipulation of Perceptions"; IEEE Transactions of Circuits and Systems; Jan. 1999; pp. 105-119; vol. 45; No. 1; 15 pages, pp. 105-119.
S. Amarel; "On Representations of Problems of Reasoning about Actions"; Mach. Intelligence; 1968; pp. 131-171; vol. 3.
S.H. Rubin, S.N. J. Murthy, M.H. Smith and L. Trajkovic; "KASER: Knowledge Amplification by Structured Expert Randomization"; IEEE Transactions on Systems, Man and Cybernetics-Part B: Cybernetics; Dec. 2004; pp. 2317-2329; vol. 34; No. 6.

* cited by examiner

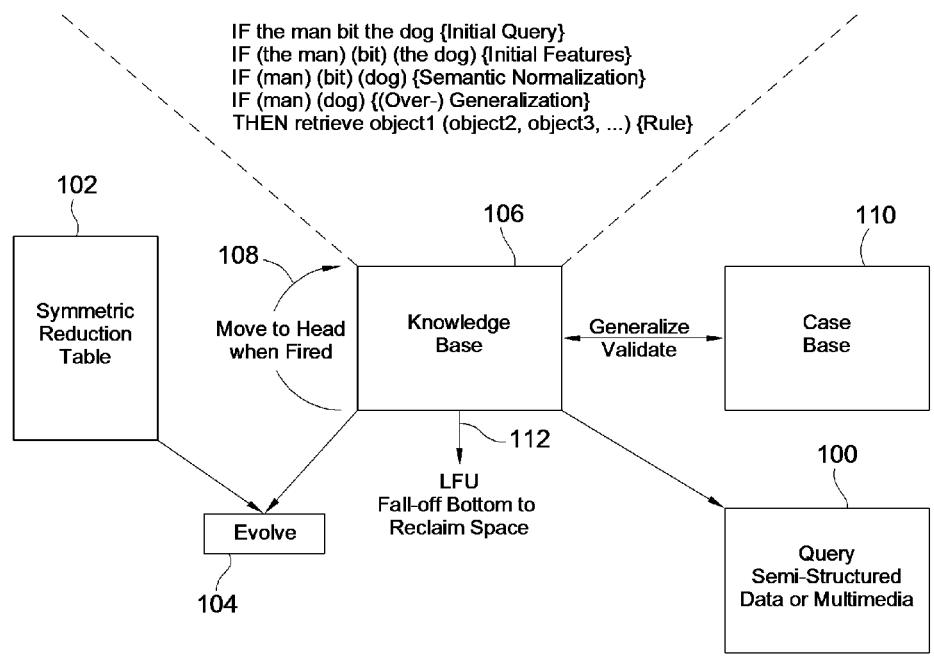

GEODESIC SEARCH AND RETRIEVAL SYSTEM AND METHOD OF SEMI-STRUCTURED DATABASES

FEDERALLY-SPONSORED RESEARCH AND DEVELOPMENT

This invention (Navy Case No. 98,477) is assigned to the United States Government and is available for licensing for commercial purposes. Licensing and technical inquires may be directed to the Office of Research and Technical Applications, Space and Naval Warfare Systems Center, San Diego, Code 2112, San Diego, Calif. 92152; voice (619) 553-2778; email T2@spawar.navy.mil.

CROSS-REFERENCE TO RELATED APPLICATIONS

This application is related to pending patent application Ser. No. 11/971,393 filed Jan. 9, 2008, entitled SYSTEM AND METHOD FOR GEODESIC DATA MINING, assigned to the same assignee as the present application, and the details of which are hereby incorporated by reference.

BACKGROUND OF THE INVENTION

A fundamental component of ISR (Information, Surveillance, Reconnaissance) technologies pertains to all levels of data fusion and extrapolation. The greater need, however, is for methods that can parse natural language queries, map them to their semantic normalization, and retrieve information associatively tagged with the normalization in a seamless heterogeneous architecture. Retrieved information can be passive in the sense that it is limited to the data level or active in the sense that it may be a method for computing the desired information. The scientific goal is to make literal and latent information alike, which may be imbued in a semi-structured database, available for reuse and subsequent integration. While this is a computationally intensive process, it has the advantage of being maximally amenable to execution on fine-grained processors.

Unlike the case for neural network applications, a consequence of semantic retrieval is that resulting knowledge can be explained to the user by way of metaphor. Moreover, prior systems such as that described in U.S. Pat. No. 7,047,226 to Dr. Stuart H. Rubin, entitled SYSTEM AND METHOD FOR KNOWLEDGE AMPLIFICATION EMPLOYING STRUCTURED EXPERT RANDOMIZATION, the teachings and disclosure of which are hereby incorporated in their entireties by reference thereto, can generate analogous features from a feature set. This advancement over first-, second-, and even third-generation expert systems automatically expands the rule base without the concomitant data input burden associated with error correction needed to optimize expert system performance. The Rubin Knowledge Amplifier with Structured Expert Randomization (KASER) expert system described in the Rubin patent includes learning means for acquiring a rule system that functions as a larger virtual rule system with reduced error probability. Given that this semantic retrieval methodology can automatically learn to extract relevant phrases (i.e., features) and their sequence from a supplied query, the system will converge on ever-better sets of features and heterogeneous rules expressed in terms of those features for purposes of fusion and prediction.

The product of Dr. Rubin's later work on a semantic normalizer can be easily trained by a bilingual and otherwise ordinary user to translate natural languages (e.g., to backend commercial off-the-shelf (COTS) Arabic to English translators). This project also resulted in a novel learning algorithm for message summarization for use by various naval reporting agencies. However, it is clear that potential transitional customers for the semantic normalizer wanted a product that they did not have to train. Further, application domains such as battle management, logistics, signal analysis, targeting and tracking, counter-insurgency, as well as the development of intelligent auto pilots for Unmanned Aerial Vehicle-Smart Warfighting Array of Reconfigurable Modules (UAV (swarms)), among others, currently are also forced to rely on various combination of conventional methodologies (e.g., case-based reasoning, expert systems, genetic algorithms, neural networks, support-vector machines, etc.).

In view of the foregoing, it is clear that there is a need in the art for a hardwired natural language interface for a relational database structured query language (SQL) and a data mining capability that is capable of communication and learning, without requiring a human to train the system. The invention provides such a knowledge-based decision support system that allows for communication and learning to occur, using natural language. These and other advantages of the invention, as well as additional inventive features, will be apparent from the description of the invention provided herein.

BRIEF SUMMARY OF THE INVENTION

In view of the above, embodiments of the present invention provide an improved knowledge-based decision support system that allows for communication and learning to occur, using natural language, and has a capability to automatically extract features from the natural language using symmetric reductions and random search. More particularly, embodiments of the invention provide for the iterative generalization of the rule base and checking of the resultant base against a case base from which the generalizations are induced. The decision support system can be used to search semi-structured databases and automatically learns new knowledge and search control knowledge where it is most needed based on the pattern of previous rule firings.

Given that embodiments of the semantic retrieval methodology of the present invention can automatically learn to extract relevant phrases (i.e., features) and their sequence from a supplied query, the system will converge on ever-better sets of features and heterogeneous rules expressed in terms of those features for purposes of fusion and prediction. Features are evolved along geodesic lines to minimize evolutionary time, but are necessarily annealed to insure diversity.

Embodiments find particular applicability for command, control, and communication systems, and enables language dependent and independent communications between humans and systems. The system improves human-information system interaction in distributed computing environments, including command system applications, and aids processing by information systems of human originated inputs and queries. Embodiments provide domain-dependent and independent information detection, extraction, and retrieval, as well as intelligent and dynamic information summarization and presentation. The system supports networking technologies and architectures that support interaction between humans and information systems as well as collaboration applications. The system also has applicability to data fusion and analysis for heterogeneous source data (e.g., radar and acoustic, imagery and messages), as well as providing knowledge discovery and dissemination.

Advantageously, embodiments of the present invention learn by example, and learns sentential features automatically using symmetric operations with annealing. The system preferably maps natural language onto its semantics, many to one. In one embodiment, the system learns to understand at least typed English communications. An embodiment of the invention bears proportion to the utility of the rule in the probability of feature creation. Preferably, the system maps semantics onto rule consequences, i.e., it provides decision-support capabilities. Consequents may search for semi-structured database information, or synthesize multimedia object sequences. In one embodiment, the system iteratively randomizes the rule base and checks results against the saved case base. Indeed, one embodiment maintains a case base for use in validating generalized rules.

A preferred embodiment of the present invention learns to understand natural language, maps semantics to an action, checks the validity of the rule against a saved case base, and iteratively generalizes that rule base to provide a learning decision support capability.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 1 is a functional block diagram of one embodiment of a geodesic search and retrieval of semi-structured data or multimedia system constructed in accordance with the teachings of the present invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE EMBODIMENTS

The semantic search and retrieval of semi-structured database information (including multimedia objects and events) can perhaps best be introduced by way of example. That is, suppose that one entered the natural language query, "Where is the nearest place for treating victims of gas explosions?" It is desired that the information systems be capable of replying with say, "I have three hospitals in New Orleans with burn units in order from nearest to furthest." Of course, it is also desirable for the information system to be able to further query the user to recursively disambiguate the last query, as necessary. For example, the system might query, "What are victims of gas explosions?" The user could reply, "They are burned, in shock, and/or not breathing." The system would learn this association and not repeat it twice in the same context. Observe that the mapping from "victims of gas explosions" to "burn units" in this case is strictly semantic, where the semantic association is acquired through the disambiguation of context. A methodology for machine learning, as applied to contextual disambiguation, serves as a focus for embodiments of the present invention.

Context-sensitive learning has been used by the KASER (discussed above) for the generation and necessarily limited checking of metaphorical knowledge. The approach of embodiments of the present invention, to be discussed more fully below in association with FIG. 1, is predicated on randomization theory. This allows such embodiments to be coordinated for execution on massively concurrent distributed processors, which is necessary for scalable realization. That is, the process of semantic association and normalization provide for information reuse, which allows for an exponential reduction in the search space. The process for performing semantic association and normalization requires domain-specific knowledge, and the evolutionary acquisition of such knowledge will be discussed below.

Here, that process may be generalized and consider the triangle inequality for evolutionary functional instantiation. Let, $f_i$ represent an arbitrary total computable program having m articulation points (i.e., formal parameters). It may be stated, without loss of generality that each articulation point has on average n values (i.e., value parameters) that it can assume. The task then is to find a mapping for each articulation point such that the mapping $f_i((In_0, Out_0), (In_1, Out_1), \ldots, (In_{p-1}, Out_{p-1}), (In_p, Out_p))$ is satisfied. That is, $f_i$ must simultaneously map p I/O pairings. Fuzzy mapping is not enjoined and in any case the complexity of conducting a random search here is $O(n^m)$.

It is recognized that a consequence of randomization theory is that the minimal value for p cannot be proven in the general case. Nevertheless, random testing theory provides the mechanics for comparing the efficacy of two alternative test sequences. For example, when testing a simple sort routine, (((1 2 3) (1 2 3)) ((3 2 1) (1 2 3)) ((3 1 2) (1 2 3)) ((0) (0))) will do a better job, on average, of covering the execution paths of the sort routine than will the test of the same magnitude, (((1) (1)) ((2 1) (1 2)) ((3 2 1) (1 2 3)) ((4 3 2 1) (1 2 3 4))). The reason here is that the latter can be randomized into a theory; namely, ((n, n−1, . . . 2, 1) (1, 2, . . . , n−1, n)), which the former test sequence cannot (i.e., it is more or less of a fixed point).

Ideally, test sequences are random, which is defined by the point at which the size of the test sequence in bits approximates the size of the minimal program (i.e., theory) that captures it. Next, consider breaking $f_i$ into q schemas—$f_j, f_k, \ldots, f_u$ such that each total computable function has approximately $m' = \lceil m/q \rceil$ articulation points. Moreover, a reduction in the number of articulation points implies that n'<<n because there will be less formal parameters that one needs to provide a range for. The complexity of conducting a random search here and in general is $O(n'^{\lceil m/q \rceil})$. Clearly, this is an exponential reduction in the search space as a function of q, as claimed. What becomes apparent here is that a little knowledge, represented as a schema as opposed to rules, frames, cases, etc. can have an enormous impact on that which is tractably computable. This means that the process of semantic association and normalization in accordance with the teachings of the present invention has the potential to "exponentially" improve the quality and quantity of reuse in any pattern-matching search and retrieval system.

A change in the representation of knowledge can have a critical impact on that which is and is not solvable. Humans tend to excel at finding better and better representations for knowledge. On the other hand, computers tend to far exceed human capabilities for number processing. What is needed is a symbiosis of the two paradigms—ideally the human will do what (s)he does best and the computer will follow suite. Given this, embodiments of the present invention incorporate a form of Evolutionary Programming (EP) to find sentential features to determine the best learning algorithm and let the computer process it.

Compare and contrast this with genetic algorithms or neural networks that are NP-hard (Nondeterministic Polynomial-hard) in their learning and are thus theoretically reducible to bit-level representations. One way to avoid such intractability, in practice, is to encode high-level static feature representations into the domain. Better results can be achieved though through the proper evolution and inclusion of domain-specific features. The geodesic principle implies that all sub-systems are mutually dependent. Thus, the computationally costly evolution of the best feature sets benefits from the co-evolution of its guiding heuristics and vice versa as will be seen from the description below.

With this in mind, the following will discuss the heuristic evolutionary feature decomposition utilized in embodiments of the present invention. The evolution of parsing (i.e., breakpoint) knowledge is based on the concept of contextual reduction. Again, consider the example query, "Where is the nearest place for treating victims of gas explosions?" It follows from the triangle inequality for evolutionary functional instantiation that the query needs to be reduced to its most basic set of features in order to minimize the computational complexity of normalization.

For example, such a set is properly defined by, ((where is the) (nearest place for) (treating victims of) (gas explosions)). At first glance, it might appear that one can further simplify these parenthesized features by removing prepositions such as, "the", "A", etc. However, this deceptively simple approach might for example also transform (Vitamin A) into (Vitamin). Rubin et al. (Field-Effect Natural Language Semantic Mapping, *Proc.* 2003 *IEEE Int. Conf. Syst. Man, Cybern.*, Washington, D.C., pp. 2483-2487, 2003, the teachings and disclosure of which are hereby incorporated in their entireties by reference thereto) have proposed a field-effect approach to natural language semantic mapping that is based on the iterative randomization of sentential semantics. In this paper, a domain-specific algebra is developed for acquiring sentential knowledge that is capable of transforming such features as, (the man bit the dog) into semantically equivalent, but syntactically simplified ones, such as (man bit dog). FIG. 1 illustrates this example.

Using a set-based methodology made clear in this paper, the example query introduced above would be further randomized to become ((where) (nearest place) (treating victims) (gas explosions)). Features can be thus normalized in linear time on a concurrent architecture, or in quadratic time as a function of sentential length on a serial processor. Features are then associatively hashed using a symbol table. The rate of growth in the symbol table decreases exponentially with scale. Again, this is in keeping with a scalable design.

The initial query has been reduced to a set of integer tokens and that set is then mapped to the user-defined proper response; be that a machine-generated query to elicit further details for purposes of disambiguation, an effective procedure for generating a reply, and/or as defined above, the literal, "I have three hospitals in New Orleans with burn units in order from nearest to furthest." Notice that while the semantic mapping here is one to one, syntactic mapping will be many to one. Note too that effective procedures for generating replies can execute queries formulated in local languages for the retrieval of semi-structured database information.

Having detailed the refinement and semantic mapping of features above, the question remains as to how one can best determine initial feature breakpoints. That issue will be addressed next and is resolvable through the use of randomness and symmetry. More formally, given a fixed sequence of words, $w_0, w_1, w_2, \ldots, w_n$, it is desired to identify that set of up to n+1 features, which are defined by, $w_i, \ldots, w_j, i \leq j$, such that the feature set is properly mapped to its semantic association. Then, breakpoints are defined by a set of up to n+1 ordered pairs that consist of, ($w_i$ and whether it is the start, inclusion, and/or end of a feature). Thus, there are $4^{n+1}$ possible breakpoints (i.e., start; inclusion; end; start and end). That would be several million breakpoints for a typical query. It follows that a form of Evolutionary Programming (EP) is properly applied to the approximation of the best loci for the breakpoints.

At the outset, breakpoints are evolved through the use of pure chance. Subsequently, known features stored in the symmetric reduction table 102 are iteratively applied to reduce the complexity of search. This is the symmetric step and while it never completely precludes the random step (i.e., for purposes of annealing), it should be noted that the computational complexity of solving for the (near) best breakpoints, on average, greatly decreases with scale until it becomes linear.

For example, if two normalized features have been previously acquired, (where) and (gas explosions), and stored in the symmetric reduction table 102 then the exponent in the number of possible breakpoints has been reduced by precisely this factor. If nothing else, this alone would allow EP to do a better job of optimization with the incursion of far less complexity. However, features may be embedded in other features; although, this allowance is precluded by one embodiment of the present invention. An example of embedding is provided by the feature, (natural (gas explosions)). Symmetric reduction here would preclude the discovery of the best feature, (natural gas explosions). In view of this constraint, it is preferable that random search and symmetric reduction proceed concomitantly on separate threads. That is to say that the effective discovery of the (near) best breakpoints for feature discovery is recursively enumerable, but not recursive.

The balance of computer resources to be dedicated to random vs. symmetric discovery at any given time is established in accordance with the present invention by utilizing a feedback loop that measures the degree of success in feature randomization as a function of the degree of randomness and symmetry and applies evolutionary search 104 to optimize the mixture for successful randomization over the time march. One result is that in any non-trivial (i.e., scaled) system, random and symmetric discovery must both be present.

Were the discovery process strictly symmetric, then the feedback matches or compares rule antecedents stored in a knowledge base 106 against the context including the symmetrically-reduced features. Then, a count of rules that would be properly fired versus improperly fired would yield the desired metric for comparison purposes. However, as just discussed, the discovery process is inherently random too. This means that many unknown features will be created, features that can have no match among the existing base of rule antecedents at the time of creation, i.e., via diagonalization arguments. The solution is to delay feedback until such time as the random features sufficiently populate the base of rule antecedents to themselves become more or less transformed into symmetric features. An ever higher-quality rule base is evolved by expunging those rules and their associated features, i.e., over the entire rule base, having minimal metrics. While this no doubt sounds complicated, it does reduce to a simple solution as follows.

Rules are moved to the logical head of the knowledge base 106 when fired and correct as illustrated by arrow 108. A rule is said to be properly matched if the case antecedent from case base 110, which is associated with the rule is deemed by the user to cover the semantics of the rule antecedent. Whenever domain feedback leads to the contradiction of a properly matched given fired rule, that rule and its associated case are expunged without any deletions being made to the symmetric reduction table 102, and a new case will be acquired and stored in the case base 110. Otherwise, the improperly matched rule is not expunged, but any features that co-occur in this rule and are present in the context are expunged from the symmetric reduction table 102. The fact that good features may be eliminated because they occur in the context of bad ones also has a positive side, where "single words" will be disassociated from the feature space to enable the formation of longer features. Cases associated with erroneous rules are not saved because new cases may have new features and because when space is at a premium, these cases have been shown to induce rules that are least reliable for the current context. All other rules in the knowledge base 106, which contain these expunged features are "re-expanded" about these features and subsequently re-reduced using the updated symmetric reduction table 102. Remaining word sequences, if any, may become maximal-length features after normalization.

Using the previous example, if ((where) (nearest place) (treating victims) (gas explosions)) were improperly triggered by the context about (treating victims) and (gas explosions), then assuming that (victims gas) were known by the symmetric reduction table 102, the updated result would be ((where) (nearest place) (treating) (victims gas) (explosions)). Note that (treating) and (explosions) have been subsequently normalized with possible removal as a consequence. In this manner, reductions, over time, are limited to those that prove themselves to be truly symmetric. Relatively infrequently-fired rules will eventually "fall off the bottom" as illustrated by arrow 112 and be replaced by ones containing genuine symmetric features. This statistical mechanical approach ensures that on average, random features will not survive to become persistent symmetric ones. There need be a statistical correlation between features, or sets of features, and proper actions (i.e., rule consequents).

The context must be reduced in order of non-increasing size of the reduction entries in the symmetric reduction table 102 (i.e., reducing the most-specific features first). Using an associative or hashing mechanism to parse the word sequence of length n, there are at most $$\sum_{r=1}^{n} \binom{n}{r} = 2^n - 1 = O(2^n)$$

hashes to be made, which occurs where the symmetric reduction table 102 is either empty or inapplicable. This shows that the associative parsing mechanism is quite tractable for the typical query length of say ten words or so, i.e., even with subsequent normalization. Actually, since features may not embed other features in one embodiment, the complexity of associatively parsing symmetrically reduced queries, which is the general case, is actually much less, or $O(2^{n-k/c})$, where c is the number of such reductions and k is their average length.

Having completed our discussion of heuristic evolutionary feature decomposition, there remains the need to reduce an arbitrary feature space to a more (most) salient feature space. Simply put, the less the inclusion of extraneous features, the better the pattern matcher can do in finding proper antecedents for matching the supplied context. As will be discussed in more detail below, this is best accomplished in one embodiment by using a dynamic weight vector approach. In other embodiments to be discussed below, an improved algorithm is presented, which replaces the dynamic weight vector approach with one for randomizing the feature sets themselves.

Here, a supplied context is compared to get a metric match for each case in the case base 110. Expunged features have their associated case-column set to "-" in preparation for reassignment.

Example 1:

| feature: | $f_0\ f_1\ f_2\ f_3$ | (the four features having the greatest weights) |
|---|---|---|
| context: | 1 1 1 1 | |
| case: | 1 0 1 0 → A | |
| match: | 1 −1 1 −1 | 1 = match; −1 = not match; |
| $W_0$: | .25 .25 .25 .25 | score = .25(1) + .25(−1) + .25(1) + .25(−1) = 0; |
| $W_1$: | .20 .20 .40 .20 | score = .2(1) + .2(−1) + .4(1) + .2(−1) = 0.2 (better) |

Example 2:

| feature: | $f_0\ f_1\ f_2\ f_3\ f_4$ | |
|---|---|---|
| context: | 1 1 1 1 1 | |
| case: | 1 0 1 0 — → A | (Cases may be lacking one or more features) |
| match: | 1 −1 1 −1 0 | 1 = match; −1 = not match; 0 = omitted; |
| $W_0$: | .20 .20 .20 .20 .20 | score = .2(1) + .2(−1) + .2(1) + .2(−1) + .2(0) = 0 |
| $W_1$: | .17 .17 .33 .17 .17 | score = .17(1) + .17(−1) + .33(1) + .17(−1) + .17(0) = 0.167 (better); |

When evaluating a $W_i$, each row in the range, where there must be at least two rows in the range having the same consequent, will in turn have its antecedent, $a_{i,j}$, serve as a context, $c_j$. This context will be compared against every row excepting that from which it was derived. The score of the ith row is given by $\sum_{j=1}^{n} w_j(c_j - a_{i,j})$, where $\forall_j | w_j \geq 0$ and $\Sigma w_j = 1$. In the case of Boolean functions, define $$(c_j - a_{i,j}) = \begin{cases} +1, & a_{i,j} = c_j; \\ -1, & a_{i,j} = \overline{c_j}; \\ 0, & \text{otherwise.} \end{cases}$$

Here, if the row having the maximum score has the correct consequent, award +1; otherwise, −1. In the case of real-valued functions, define $(c_j - a_{i,j}) = |c_j - a_{i,j}|$, which is always defined. Here, if the row having the minimum score has the correct consequent, award +1; otherwise, −1. Thus, the higher the score, the better the W, where a perfect score is defined to be the number of rows in the range—the number of singleton classes there.

Example 2 is reworked below for the situation where there is continuous variation (Δ). By design, there will never be any omitted features here.

Example 2':

| feature: | $f_0\ f_1\ f_2\ f_3\ f_4$ | |
|---|---|---|
| context: | 1 1 2 4 1 | (can be phrases, rays, track prediction, etc.) |
| case: | 3 1 3 3 1 → A | |
| Δ: | 2 0 1 1 0 | perfect match = 0; |
| $W_0$: | .33 .17 .17 .17 .17 | score = .33(2) + .17(0) + .17(1) + .17(1) + .17(0) = 1.0 (can be larger); |

-continued

Example 2':

$W_1$: .20 .20 .20 .20 .20  score = .2(2) + .2(0) + .2(1) + .2(1) + .2(0) = 0.8 (better);

The advantage provided by such a weighted vector approach is that it allows the system to hill-climb an optimal solution using sigmoid functions. However, as will be seen below, hill-climbing can take the form of iterative symbolic improvement as well. The relative advantage here is best made clear by way of example. The inherent problem with the sigmoid approach is that one can map, e.g., cases to chess boards, but unless an exact match is to be had, there is almost nothing to be gained by finding that the current board is almost the same as the saved board. This is because, in chess and many other domains of practical import, variation in a single degree of freedom, e.g., the color of the square a piece sits on, makes all the difference. This argument naturally extends to procedural consequents as well.

This will not be a problem using the approach discussed below because that approach seeks to symbolically and iteratively remove extraneous features. It then climbs from working rule sets to more general rule sets that remain relatively valid. That is principally why the second approach used in alternate embodiments is preferred over this "neural" one. Indeed, when the numerical basis for a fuzzy logic is relaxed, the system can attain a capability to compute with words using self-referential symbolic transformations, or protoform schemas.

In the paper "On Randomization and Discovery," Information Science, vol. 177, pp. 170-191, 2007, the teachings and disclosure of which are hereby incorporated in their entireties by reference thereto, the Semantic Randomization Theorem (SRT) (i.e., $\exists k | \forall c \geq k > 0, \phi_r = \phi_i^{t+c}(1) = \phi_i^{t+k}(1), |\phi_r| < |(\phi_u || \phi_v)|$) is proven. First however, this paper proves that in general, randomization is inherently a heuristic process. Indeed, the arguments presented by Rubin in "Computing with Words," IEEE Trans. Syst. Man, Cybern., vol. 29, no. 4, pp. 518-524, 1999, and by Zadeh in "From Computing with Numbers to Computing with Words—From Manipulation of Measurements to Manipulation of Perceptions," IEEE Trans. Ckt. and Systems, vol. 45, no. 1, pp. 105-119, 1999, the teachings and disclosure of which are hereby incorporated in their entireties by reference thereto, are captured by the Unsolvability of the Randomization Problem, which is reproduced below in view of its briefness and relevance. This theorem serves to vindicate the inherent need for heuristics in symbolic randomization and in so doing, likewise vindicates the algorithmic approach discussed below.

Theorem (unsolvability of the randomization problem): There is no algorithm, which when presented with indices i and j of arbitrary computable functions $\phi_i: N \rightarrow N$ and $\phi_j: N \rightarrow N$ can decide whether $\phi_i$ is a randomization of $\phi_j$. Thus, there is no algorithm, which when presented with the index j of an arbitrary computable function $\phi_j: N \rightarrow N$, $j \in N$, can randomize that function (i.e., transform it into $\phi_i$, where i indexes an arbitrary randomized, or random, function).

Proof: Define the total function $$\text{random}(i, j) = \begin{cases} 1, & \text{if } \varphi_i \text{ randomizes } \varphi_j; \\ 0, & \text{otherwise.} \end{cases}$$

The randomization function $\phi_a$ is computable by definition. This function, in its simplest form, removes all redundant Begin End; pairs. Let i be a generalized index for it. It should be clear that it can now be written, algorithm(j)=random(i,j) for all j∈N, where algorithm:N→N was defined in equation (5) in "On Randomization and Discovery." The computability of "random" has thus been reduced to that of "algorithm." Since "algorithm" is not computable, "random" cannot be either.

It follows as a consequence of the SRT that the complexity (density) of knowledge is unbounded in the limit. While intelligence is in every case constrained by the operant laws of space and time, every non-trivial (i.e., self-referential) finite realization of intelligence involving randomization is necessarily domain specific and not recursively enumerable (i.e., inherently heuristic) as a consequence of this theory. The methodology used to prove the SRT allows the definition of a heuristic mechanics in the novel algorithm for randomizing feature sets for use in the geodesic search and retrieval of semi-structured databases in accordance with an embodiment of the present invention.

In view of this, embodiments of the present invention utilize this improved innovative algorithm for iteratively generalizing the feature space, as depicted in FIG. 1. The previous example, as currently written, has ((where) (nearest place) (treating victims) (gas explosions))→"I have three hospitals in New Orleans with burn units in order from nearest to furthest." One candidate randomized rule would be ((where) (treating victims) (gas explosions))→"I have three hospitals in New Orleans with burn units in order from nearest to furthest."

A geodesic randomization is defined over the entire rule knowledge base 106, since each randomization can potentially affect that which can be randomized, i.e., because of the introduction of contradictions. In other words, the randomization space is co-dependent. The algorithm for geodesic randomization follows.

Cases stored in case base 110 include a dynamic feature set paired with a literal or procedural sequence, e.g., for retrieving semi-structured database information 100. Predicate features may have just three possible values, namely, TRUE, FALSE, or UNDECIDED.

All rules in the knowledge base 106 that participated in a correct prediction are logically moved 108, with their associated cases, to the head of the list, otherwise maintaining a stable (i.e., original) ordering. The Least-Frequently Used (LFU) (bottom) cases/rules are expunged to the next memory level (arrow 112) whenever the higher-level memory limit is reached to make room for insertion at the list head. Cases/rules need never be purged, but are progressively moved to higher-order (i.e., slower) memory. The allowed number of cases at the highest-level of memory is determined by the time it takes to follow the following skew to its inclusive conclusion:

i=1;
Repeat
   Select a case for generalization using a uniform random
      number generator (Twister) with integers in [1, i];
   If i<current number of cases in the case base, i←i+1
Until
   Wake-Up;

A new case, if not already present in case base 110, is appended to the head just in case the previous prediction proves to be wrong or is UNDECIDED. This allows for a memory that may extend beyond the recent past and is maximally compact and has the best predictive capability.

Randomization iteratively, i.e., allowing for interrupt, transforms a case base 110, as defined above, into a most-general rule base. Consequents may be assumed to be atomized and thus are non-divisible. Otherwise, one could always non-monotonically atomize them so as to fire in sequence, as desired.

A case can be randomized by a maximum of $2^n$ candidate rules. This is potentially an intractable number over the entire case base 110. In view of this potential problem, select a case for randomization with dynamic probability of selection skewed in favor of those rules in the knowledge base 106 which are most-frequently fired. The higher the rule, the greater the likelihood of selection. A good scheme (i.e., the 3-2-1 skew discussed above) for achieving this with an application knowledge base 106 of r rules is to assign the head rule a probability of being selected of $$\frac{2r}{r(r+1)}.$$

The rule just below the head rule has a probability of being selected of $$\frac{2(r-1)}{r(r+1)}.$$

Finally, the tail rule of the base has a probability of being selected of $$\frac{2}{r(r+1)}.$$

A highly efficient algorithm for realizing the 3-2-1 skew is shown above. Note that that algorithm has the added advantage of favoring just the head of the list during very short naps, which is proportionately most in need of generalization time. Also, it is proper to stagnate at a uniform search of all rules because skew search time grows as the order square of the size of the knowledge base 106, while the number of parallel processors can only grow linearly. Thus, a point is reached whereupon it is impossible to follow the skew to its conclusion.

A generated rule replaces an existing rule, associated with a case, if and only if a=the total number of predictions and b=the ratio, number correct predictions/a, are both non-decreasing. Multiple rules are not evolved for a single case because erroneous or absent rules will lead to further case acquisitions, which in turn will indirectly lead to the acquisition of proper rules. Care is taken so that the same feature (rule) does not appear in the rule (base) more than once at any time. All rules are evaluated against new cases, using a single pass, by updating and saving their variable a, b statistics.

Symmetric and random search are run in parallel on separate threads. As discussed above, symmetric reductions are made using the symmetric reduction table 102. Whenever domain feedback leads to the contradiction of a properly matched given fired rule, that rule and its associated case are expunged without any deletions being made to the symmetric reduction table 102; and, a new case will be acquired. Otherwise, the improperly matched rule is not expunged; but, any features that co-occur in this rule and are present in the context are expunged from the symmetric reduction table 102. Again, a rule is said to be properly matched if the case antecedent, which is associated with the rule is deemed by the user to cover the semantics of the rule antecedent.

Rules in the knowledge base 106, which contain expunged features are "re-expanded" about these features and subsequently re-reduced using the updated symmetric reduction table 102. Remaining word sequences, if any, may become maximal-length features after normalization. Relatively infrequently-fired rules will eventually "fall off the bottom" as illustrated by arrow 112 and be replaced by ones containing genuine symmetric features.

Applicable rules, if any (i.e., otherwise "UNDECIDED"), first have their b ratios normalized so that they sum to unity. Next, redundancy, if any, is removed from the consequents by replacing equivalent consequents with one having the sum of their probabilities as well as a sum of their total number of predictions. The resultant rules, if any, are presented to the inference engine in order of decreasing probability and may be shown. Ties, if any, are broken in favor of the maximal "total number of predictions" and then in favor of the head rule (i.e., temporal locality). Just in case a prediction fails or is UNDECIDED, the current non-redundant case is inserted at the head once its true consequent becomes known. A contradictory or duplicate case and its associated rule are permanently expunged (i.e., not moved to slower memory), where found.

Show the number of successful generalizations made in the last time unit(s) so that wakeup times can be put on a more informed basis. Then, interrupts can be automatically effected by numeric squelches, e.g., less than one successful generalization per minute. The evolution of breakpoints will be interleaved with that of rule generalization on a sequential architecture.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

It will be understood that many additional changes in the details, materials, steps and arrangement of parts, which have been herein described and illustrated to explain the nature of the invention, may be made by those skilled in the art within the principal and scope of the invention as expressed in the appended claims. For example, it should be apparent that the geodesic search and retrieval method described and shown above could be embodied in a computer readable medium having stored thereon computer executable instructions for performing those method steps.

What is claimed is:

1. A method of geodesic search for a semi-structured database and retrieval of relevant information therefrom based on a natural language query, comprising the steps of:
    parsing the natural language query to identify domain-specific semantic features of the natural language query;
    mapping the features to their semantic normalization stored in a symmetric reduction table;
    mapping the semantic normalization to rules in a knowledge base;
    retrieving information from the semi-structured database tagged with the semantic normalization based on the rules;
    measuring a degree of success of the step of retrieving;
    evolutionarily decomposing features stored in the symmetric reduction table that co-occur with rules that are improperly matched to retrieved information as determined by the step of measuring;
    reducing an arbitrary feature space derived from the step of parsing to a more salient feature space to reduce inclusion of extraneous features wherein the step of reducing comprises the steps of:
    comparing a context of the features parsed from the natural language query to cases stored in a case base to determine a metric match therefor;
    assigning a relative weighting factor to the features;
    calculating a score based on the metric match and the relative weighting factors; and
    selecting a case having the highest score for retrieving information from the semi-structured database; and
    replacing an existing rule in a case with a generated rule associated with a case when the total number of predictions "a" and the ratio "b" of the number of correct predictions divided by "a" are both non-decreasing.

2. The method of claim 1, further comprising the step of recursively disambiguating the natural language query when at least one feature is unknown.

3. The method of claim 1, further comprising the step of randomly searching the symmetric reduction table during the step of parsing to improve feature identification.

4. The method of claim 1, wherein the semi-structured database stores active and passive information and wherein the step of retrieving information comprises the step of retrieving passive information from the semi-structured database.

5. The method of claim 4, wherein the step of retrieving information comprises the step of retrieving active information for computing information.

6. The method of claim 1, wherein the step of reduction comprises the step of iteratively randomizing a case by a maximum of $2^n$ candidate rules to transform the case base into a most-general rule base.

7. The method of claim 6, further comprising the step of selecting a case for randomization with dynamic probability of selection skewed in favor of those rules which are most frequently fired.

8. The method of claim 7, further comprising the steps of assigning a head rule at the logical top of the rule base a probability of being selected of $2r/r(r+1)$, where r is the total number of rules in the knowledge base, assigning a logical next rule a probability of being selected of $2(r-1)/r(r+1)$, and continuing to assign each successive rule a probability of being selected such that a logical last rule has a probability of being selected as $2/r(r+1)$.

9. The method of claim 8, wherein the step of selecting comprises the step of calculating a 3-2-1 skew.

10. The method of claim 1, wherein the step of reducing comprises the steps of:
    running in parallel on separate threads the steps of:
    comparing a context of the features parsed from the natural language query to cases stored in a case base to determine a metric match therefore, assigning a relative weighting factor to the features, calculating a score based on the metric match and the relative weighting factors, and selecting a case having the highest score to be used in the step of retrieving information from the semi-structured database; and
    iteratively randomizing a case by a maximum of $2^n$ candidate rules to transform the case base into a most-general rule base.

11. A non-transitory computer readable medium having stored thereon computer executable instructions for performing the method of claim 1.

12. The method of claim 1, wherein the step of reducting comprises the steps of:
    moving a rule to a logical head of the knowledge base when the step of measuring indicates that the rule was correctly fired;
    moving a case associated with the rule moved in the step of moving to a logical head of the case base to facilitate its selection upon further queries.

13. The method of claim 12, further comprising the step of allowing least-frequently used rules and their associated cases to be logically moved to the bottom of the knowledge base and the case base to reduce a likelihood of selection upon further queries.

* * * * *